(No Model.)
H. OLIVER & E. SCOTT.
APPARATUS FOR HANDLING BILLETS, INGOTS, &c.
No. 521,474. Patented June 19, 1894.
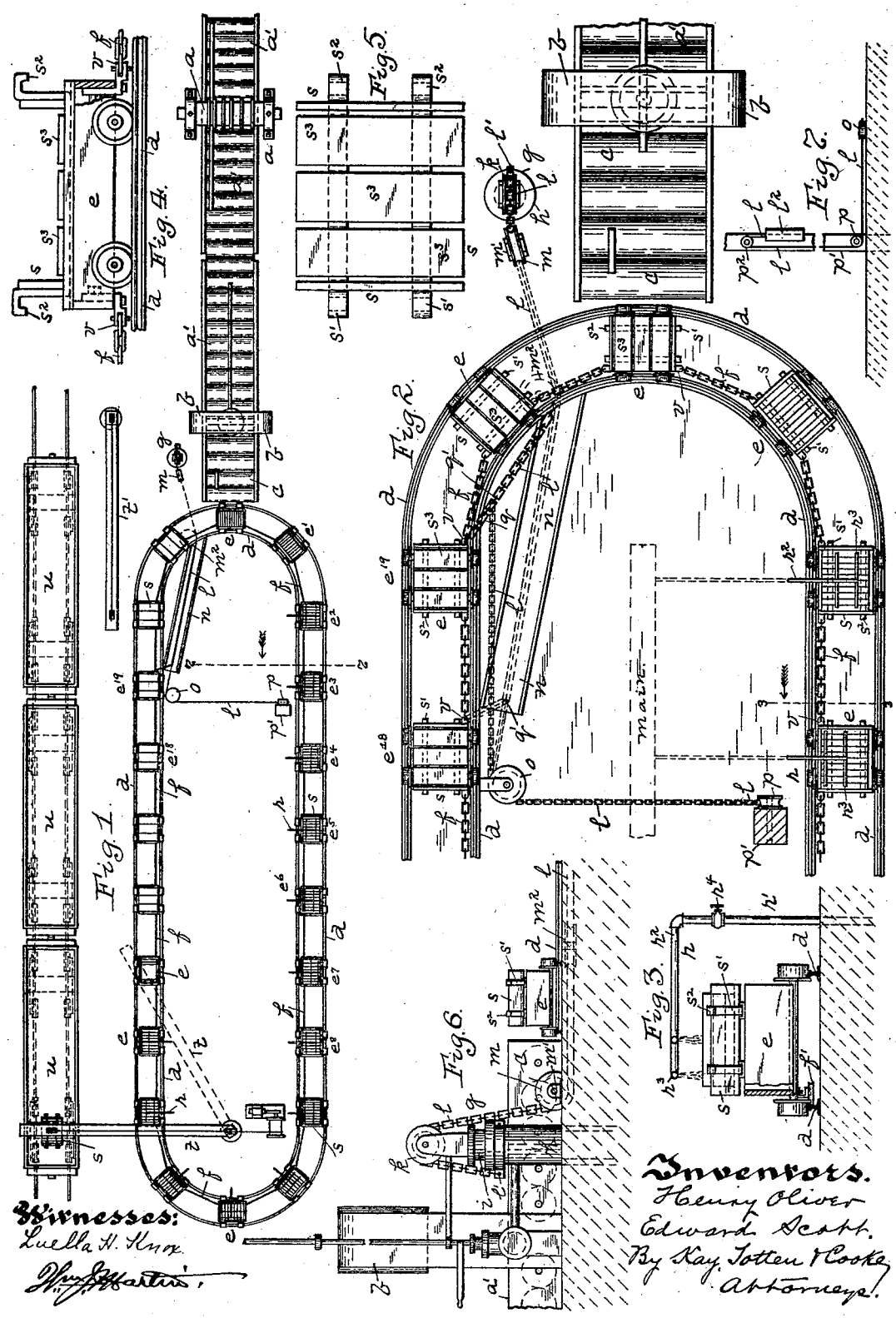
Witnesses:
Luella H. Knox.
Wm. J. Martin.
Inventors.
Henry Oliver
Edward Scott.
By Kay, Totten & Cooke
Attorneys.
THE NATIONAL LITHOGRAPHING COMPANY,
WASHINGTON, D. C.

UNITED STATES PATENT OFFICE.

HENRY OLIVER AND EDWARD SCOTT, OF ALLEGHENY, PENNSYLVANIA.

APPARATUS FOR HANDLING BILLETS, INGOTS, &c.

SPECIFICATION forming part of Letters Patent No. 521,474, dated June 19, 1894.

Application filed February 14, 1894. Serial No. 500,122. (No model.)

*To all whom it may concern:*

Be it known that we, HENRY OLIVER and EDWARD SCOTT, residents of Allegheny, in the county of Allegheny and State of Pennsylvania, have invented a new and useful Improvement in Systems for Handling Billets, Slabs, Ingots, &c.; and we do hereby declare the following to be a full, clear, and exact description thereof.

Our invention relates to a system for handling billets, slabs, ingots, &c., as well as to the apparatus employed in carrying out said system.

The object of our invention is to provide a system which will dispense with a great deal of the time and labor heretofore expended in the handling of the metal.

To these ends our invention consists, generally stated, in arranging the billets, slabs, ingots, &c., as they come from the discharge platform, on a carrier which is one of an endless line of carriers constructed to travel on an endless track in front of said discharge platform, and a series of spraying pipes arranged at intervals around said track for throwing water on said carriers, together with mechanism for moving said carriers and for lifting the billets therefrom, all of which will be fully hereinafter set forth.

To enable others skilled in the art to make and practice our invention, we will describe the same more fully, referring to the accompanying drawings, in which—

Figure 1 is a plan view of our improved system. Fig. 2 is an enlarged plan view of the upper portion of the same. Fig. 3 is a view of one of the carriers when loaded and exposed to the water from the discharge pipes on the line 3—3 Fig. 2. Fig. 4 is a side elevation of one of the carriers. Fig. 5 is a plan view of one of the pans on which the billets are piled. Fig. 6 is a side elevation of the mechanism for moving the carriers; and Fig. 7 is a view on the line 7—7 Fig. 1.

Like letters indicate like parts in each of the figures.

We have illustrated our invention in the accompanying drawings in its application to the handling of billets as they come from the shear table. Our improved system may, however, be applied to the handling of billets, slabs, ingots, &c., under other conditions and circumstances besides the mere use of it in connection with the shear table.

In Fig. 1 of the drawings a plan view of the system is given, in which $a$ designates the rolls and $a'$ the feeding tables for reducing the ingot to the desired length and thickness for shearing. The shears are represented at $b$, said shears being adapted to cut the metal reduced by the rolls $a$ to the required length and thickness. The billets cut by the shears $b$ drop onto the shear-table $c$, which is generally composed of a series of revolving rollers which carry the billets forward. In front of the shear table $c$ is an endless track $d$, which may be extended to any desired length according to the size and capacity of the plant. Mounted on the track $d$ are the buggies or carriers $e$, $e'$, $e^2$, $e^3$, $e^4$, &c., of such a height that the billets coming from the shear table $c$ can be conveniently piled on said buggies as they stand in front thereof. These buggies $e$, $e'$, $e^2$, &c., are connected together by the chains $f$, thus forming an endless line of carriers. In order to prevent said buggies from jumping the track on the curves we provide them with the horizontal wheels $f'$, which engage the head of the outer rail of said track.

To provide for the movement of the buggies $e$, $e'$, $e^2$, $e^3$, &c., upon the track $d$ we provide a hydraulic ram $g$, which consists of the cylinder $h$ with the ordinary plunger $i$, and operated in the usual manner. Carried by the upper end of said plunger $i$ is the sheave $k$. A rope or chain $l$ is secured at $l'$ to the cylinder $g$ and passes up over the sheave $k$, thence down under a sheave $m$ journaled in suitable bearings $m'$. Said chain then passes under the track around a horizontal sheave $m^2$. A channel or conduit $n$ is provided to receive said chain $l$ after it leaves the sheave $m^2$. The chain $l$ passes through said channel $n$ and around a second horizontal sheave $o$, thence to a pulley $p$ on the foot of the post $p'$, up said post and over a sheave $p^2$ at the top of said post. A weight $l^2$ is secured to the end of said chain. An auxiliary chain $q$ is secured to the chain $l$ at $q'$, said chain $q$ having a hook secured thereto to connect said chain up to the buggies $e$. For this purpose said buggies are provided with rings $v$.

A series of sprinklers $r$ are arranged at suitable intervals around the track $d$. These sprinklers $r$ consist of the vertical pipe $r'$ having the horizontal pipe $r^2$ connected thereto. From the horizontal pipe $r^2$ project the branch pipes $r^3$ at right angles thereto. The branch pipes $r^3$ are provided with openings. The vertical pipe $r'$ is connected up to a suitable water supply pipe and said pipe $r'$ is provided with a valve $r^4$. The pipes $r'$ are of sufficient height to bring the branch pipes $r^3$ over the billets piled upon the buggies $e$, $e'$, $e^2$, &c., so that when the water is turned on the water escaping from the openings in the branch pipes $r^3$ will fall upon said billets. The branch pipes $r^3$ of each sprinkler are arranged to break joint with those of the next one, that is, the branch pipes of one sprinkler will be arranged in the pipe $r^2$ so that the outer branch pipe will be about the middle of said pipe $r^2$, while the next sprinkler will have the outer branch pipe at the outer end of said pipe $r^2$ and the inner pipe at about the middle.

In order to lift the billets from the buggies in a body the said billets are loaded into pans $s$, which rest upon the buggies $e$, $e'$, $e^2$, &c. These pans $s$ are formed of the bars $s'$ bent up at their ends to form the hooked portion $s^2$. These hooked portions enable the pans to be grasped securely by the chain of the crane. The bottoms are made up of the cross pieces $s^3$ with intervening spaces to allow the water to escape and air to reach the billets at the bottom of the pile. For the same reasons the buggies $e$, $e'$, $e^2$, &c., are bottomless. A crane $t$ is provided for lifting the pans $s$ from the buggies and swinging them over the cars $u$ which may be run along the outside of the track $d$.

The operation of our improved system and the accompanying apparatus is as follows: The metal having been reduced by the rolls $a$ is carried to the shears $b$ and cut into billets. The billets fall onto the shear table $c$, whence they are carried forward and deposited on the pan $s$ of the buggy in front of said table. A man stands in front of the shear table $c$ and, by means of an iron rake, arranges the billets, which are at practically a red heat, in an even pile on said pan. When the pan has been filled and it is desired to bring another pan into position to be filled, the plunger $i$ of the hydraulic ram $g$ is raised. This will act to draw on the chain $l$, which is connected up to the buggy $e^{19}$ by the auxiliary chain $q$. As all the buggies are connected, such a drawing on the chain $l$ will move all the buggies on the track, and as soon as the buggy succeeding the one just loaded has been brought in front of the shear table $c$ the plunger $i$ is allowed to descend and is gradually lowered by the descent of the weight $l^2$, which has been raised by the elevation of the plunger. Meanwhile the buggy already loaded is moved a short distance, where it comes to a standstill and the billets are allowed to cool a little before being exposed to the water of the sprinklers. As the billets are intensely hot on coming from the shear table, the throwing of water on them at once would create so much steam as to make it dangerous for the men at the shear table. For this reason, therefore, the buggy when loaded is allowed time to cool a little before it is brought under the first of the sprinklers, which is far enough away from the men at the shear table to prevent injury by the steam. When the second buggy has been filled, the auxiliary chain $q$ is secured to the buggy $e^{18}$, which has been brought to the position formerly occupied by the buggy $e^{19}$. The plunger $i$ is again raised, whereupon the buggy first loaded is brought to position under the first sprinkler, and the second buggy to the position formerly occupied by the first buggy. The water is turned on and the red hot billets are subjected to a shower of water. As the outer branch pipe of the first sprinkler is at about the middle of the pipe $r^2$ the billets on the inside of the buggy get more water than those on the outside. When the third buggy has been loaded the plunger $i$ is again raised and the next buggy is brought into position in front of the shear table. The first buggy is brought under the second sprinkler and the second buggy under the first. As the outer branch pipe of the second sprinkler is on the outer end of the pipe $r^2$, the billets on the outside of the buggy not brought directly under the full shower of water of the first sprinkler are now fully exposed to the shower, while those on the inside of said buggy are not directly exposed to the water. The operation of raising the plunger is repeated until the first buggy has passed beyond the last sprinkler. The number of sprinklers may of course vary under different circumstances, but in the drawings $e^{15}$ would represent a buggy which has passed beyond the last sprinkler. The buggy is then in position to allow the crane $t$ to lift the pan therefrom. The chains of the crane are made to engage with the hooked portions $s^2$ of the pan, when said pan can be readily lifted and swung over the car $u$ and dumped thereon ready for shipment. If desired, however, the loaded buggies may be carried a farther distance on the track and the crane $t'$ may be employed for lifting the pans therefrom.

By the employment of our improved system and apparatus the billets as they come from the shear table are immediately piled on the buggies, and by having an endless line of buggies there is no delay, as there is always a buggy in position to be loaded at the same time that one is unloaded and the others are undergoing the cooling action of the water.

What we claim as our invention, and desire to secure by Letters Patent, is—

1. A plant for handling billets, slabs, ingots, &c., consisting in a discharge platform, an endless track arranged in front thereof, an endless line of carriers mounted on said track, and a series of water discharge pipes in the course of said carriers, substantially as set forth.

2. A plant for handling billets, slabs, ingots, &c., consisting in a discharge platform, an endless track arranged in front thereof, an endless line of carriers mounted on said track, pans on said carriers, and a crane for lifting said pans therefrom and carrying the same to the point of unloading, substantially as set forth.

3. A plant for handling billets, slabs, ingots, &c., consisting of a discharge platform, an endless track arranged in front thereof, an endless line of carriers mounted on said track, pans on said carriers, a railroad track adjacent to said endless track, and a crane for lifting said pans and carrying the same to the cars on the railroad track, substantially as set forth.

4. A plant for handling billets, slabs, ingots, &c., consisting in a shear having a table forming a discharge platform, an endless track arranged in front of said platform, and an endless line of carriers mounted on said track, substantially as set forth.

5. A plant for handling billets, slabs, ingots, &c., consisting of a discharge platform, an endless track arranged in front thereof, an endless line of carriers mounted on said track, and a series of water discharge pipes placed at positions corresponding to the positions of the carriers when at rest and adapted to discharge water upon the carriers, substantially as set forth.

6. A plant for handling billets, slabs, ingots, &c., consisting in a discharge platform, an endless track arranged in front thereof, an endless line of carriers mounted on said track, and a series of water discharge pipes placed in positions corresponding to the positions of the carriers when at rest, said pipes extending up at the side of and over said carriers, substantially as and for the purposes set forth.

7. A plant for handling billets, slabs, ingots, &c., consisting in a discharge platform, an endless track arranged in front thereof, an endless line of carriers mounted on said track, and a series of water discharge pipes placed in positions corresponding to the positions of the carriers when at rest and extending up at the side of and over said carriers, said discharge pipes having sprinkling arms extending over the carriers, and the sprinkling arms of one set of discharge pipes extending over the outer portion of the pan while the sprinkling arms of the next carrier extend over the inner portion thereof, substantially as and for the purposes set forth.

8. In a plant for handling billets, slabs, ingots, &c., a series of endless carriers mounted on an endless track, said carriers being bottomless, removable pans supported thereon, said pans being formed of bars bent up at their ends and having hooked portions, and cross pieces on said bars having intervening spaces, substantially as and for the purposes set forth.

9. In a plant for handling billets, slabs, ingots, &c., the combination of a discharge platform, an endless track, an endless line of carriers mounted on said track, and having connecting devices thereon, and a jacking mechanism consisting of a ram and a chain or rope extending from the same over pulleys to and adapted to be connected to the different carriers to move the line of carriers intermittently, substantially as set forth.

10. In a plant for handling billets, slabs, ingots, &c., the combination of a discharge platform, an endless track, an endless line of carriers mounted on said track and having connecting devices thereon, and a jacking mechanism consisting of a ram and a chain or rope extending from the same over pulleys to and adapted to be connected to the different carriers to move the line of carriers intermittently, and a rope or chain connected to the same and provided with a weight to draw the rope back to its normal position, substantially as set forth.

11. In a plant for handling billets, slabs, ingots, &c., the combination of a discharge platform, an endless track, an endless line of carriers mounted on said track and having connecting devices thereon, and a jacking mechanism, said jacking mechanism consisting of a vertical hydraulic ram, pulleys mounted on each side of the endless track, and a rope passing from the vertical hydraulic ram over said pulleys and adapted to be connected to the carriers, substantially as set forth.

In testimony whereof we, the said HENRY OLIVER and EDWARD SCOTT, have hereunto set our hands.

HENRY OLIVER.
EDWARD SCOTT.

Witnesses:
JAMES I. KAY,
ROBT. D. TOTTEN.